(12) United States Patent
Kwon et al.

(10) Patent No.: US 9,902,285 B2
(45) Date of Patent: Feb. 27, 2018

(54) POWER NET SYSTEM FOR FUEL CELL VEHICLE AND METHOD OF CONTROLLING THE SAME

(71) Applicant: Hyundai Motor Company, Seoul (KR)

(72) Inventors: Sang Uk Kwon, Gyeonggo-do (KR); Nam Woo Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 321 days.

(21) Appl. No.: 14/680,258

(22) Filed: Apr. 7, 2015

(65) Prior Publication Data

US 2016/0185252 A1    Jun. 30, 2016

(30) Foreign Application Priority Data

Dec. 24, 2014   (KR) .................. 10-2014-0188009

(51) Int. Cl.
| | |
|---|---|
| *B60L 1/00* | (2006.01) |
| *B60L 11/18* | (2006.01) |
| *H01M 8/04858* | (2016.01) |
| *H01M 8/0438* | (2016.01) |
| *H02J 7/00* | (2006.01) |

(52) U.S. Cl.
CPC ..... *B60L 11/1881* (2013.01); *H01M 8/04388* (2013.01); *H01M 8/04888* (2013.01); *H02J 7/00* (2013.01); *H01M 2250/20* (2013.01); *Y02T 90/32* (2013.01)

(58) Field of Classification Search
CPC ........... B60L 11/1881; H01M 8/04388; H01M 8/04888

USPC ...... 307/10.1, 9.1, 10.6, 10.7; 429/428–471; 320/101, 102
See application file for complete search history.

(56) References Cited

U.S. PATENT DOCUMENTS

2003/0111990 A1*  6/2003  Miyauchi .......... H01M 8/04567
                                                  323/288

FOREIGN PATENT DOCUMENTS

| | | |
|---|---|---|
| JP | 2003-187841 A | 7/2003 |
| JP | 2005-149920 A | 6/2005 |
| JP | 2010-176864 A | 8/2010 |
| JP | 2013-027275 A | 2/2013 |
| JP | 2013-187941 A | 9/2013 |
| KR | 2008-0044097 A | 5/2008 |
| KR | 10-2008-0054008 A | 6/2008 |
| KR | 2010-0060478 A | 6/2010 |
| KR | 2013-0042149 A | 4/2013 |

\* cited by examiner

*Primary Examiner* — Thomas Skibinski
(74) *Attorney, Agent, or Firm* — Mintz Levin Cohn Ferris Glovsky and Popeo, P.C.; Peter F. Corless (57) ABSTRACT

A power net system for a fuel cell vehicle includes: a diode having a first end connected to an output stage of a fuel cell stack; a fuel cell load device branched and connected between the output stage of the fuel cell stack and the diode; a first relay positioned between the output stage of the fuel cell stack and the fuel cell load device and configured to connect or separate the output stage of the fuel cell stack and the fuel cell load device; and a second relay having a first end connected to a second end of the diode and a second end connected between the first relay and the fuel cell load device.

16 Claims, 5 Drawing Sheets

POWER NET SYSTEM FOR FUEL CELL VEHICLE AND METHOD OF CONTROLLING THE SAME

CROSS-REFERENCE TO RELATED APPLICATION

The present application claims priority to and the benefit of Korean Patent Application Number 10-2014-0188009 filed on Dec. 24, 2014, the entire contents of which application are incorporated herein for all purposes by reference.

BACKGROUND

Technical Field

Embodiments of the present disclosure relate generally to a power net system for a fuel cell vehicle and methods of controlling the same and, more particularly, to a power net system for a fuel cell vehicle, which is capable of removing voltage at a fuel cell stack and consuming regeneration braking energy, and methods of controlling the same.

Description of Related Art

Fuel cell systems can be applied to eco-friendly-type vehicles, such as a hydrogen fuel cell vehicle. Fuel cell systems typically include, for example, a fuel cell stack for generating electric energy from an electrochemical reaction, a fuel supply device for supplying fuel (e.g., hydrogen) to the fuel cell stack, an air supply device (e.g., oxidizer) for supplying air (e.g., oxygen) for the electrochemical reaction, and a heat and water management system for controlling the operating temperature of the fuel cell stack by externally discharging an electrochemical reaction product of the fuel cell stack (e.g., heat) and performing water management.

A fuel cell load device for lowering voltage at the fuel cell stack is typically connected to the fuel cell stack in order to remove oxygen within the fuel cell stack during or after operation of the fuel cell vehicle. Oxygen introduced into the fuel cell stack is removed along with hydrogen that remains in the anode, as current is consumed through the fuel cell load device. If hydrogen remaining in the anode is not sufficient, the consumption of oxygen is impossible. In order to prevent this problem, a wakeup technology for periodically supplying hydrogen to the anode can be used.

Unlike in an internal combustion vehicle, the fuel cell system requires a separate post-processing process for lowering voltage at the fuel cell stack by removing air that remains in the fuel cell stack after the start-up is off in order to prevent the fuel cell stack from deteriorating and prevent the fuel cell stack from exposure to high voltage. If voltage is formed while oxygen remains in the anode, carbon on the cathode side is corroded and deteriorated. In order to solve this problem, there is a need for a process of removing oxygen within the fuel cell stack, preventing the introduction of additional oxygen, and removing introduced oxygen when the oxygen is introduced. It is also necessary to lower voltage at the fuel cell stack using the fuel cell load device when the fuel cell vehicle collides with another object or when the fuel cell system fails in order to prevent the fuel cell stack from being exposed to high voltage.

SUMMARY

Embodiments of the present disclosure are directed to a power net system for a fuel cell vehicle, which is capable of removing voltage at a fuel cell stack and consuming regeneration braking energy, as well as methods of controlling the same.

In accordance with embodiments of the present disclosure, a power net system for a fuel cell vehicle may include: a diode having a first end connected to an output stage of a fuel cell stack; a fuel cell load device branched and connected between the output stage of the fuel cell stack and the diode; a first relay positioned between the output stage of the fuel cell stack and the fuel cell load device and configured to connect or separate the output stage of the fuel cell stack and the fuel cell load device; and a second relay having a first end connected to a second end of the diode and a second end connected between the first relay and the fuel cell load device.

The power net system may further include an inverter connected to a node configured to connect the other end of the diode and the first end of the second relay.

The power net system may further include a converter connected to a main bus stage between the fuel cell stack and the inverter and configured to control a voltage at the main bus stage.

Voltage at the fuel cell stack may be reduced by the fuel cell load device, when the first relay is turned on and the output stage of the fuel cell stack and the fuel cell load device are connected.

Energy generated by the regenerative braking of a motor connected to the inverter may be consumed by the fuel cell load device, when the second relay is turned on and the inverter and the fuel cell load device are connected.

The first relay and the second relay are not simultaneously turned on.

Furthermore, according to embodiments of the present disclosure, an operation method of the aforementioned power net system for a fuel cell vehicle may include connecting the output stage of the fuel cell stack and the fuel cell load device by turning on the first relay and simultaneously controlling voltage at an output stage of a converter connected to a high voltage battery so that the voltage at the output stage of the converter is lower than a voltage at the output stage of the fuel cell stack, when a collision involving the fuel cell vehicle occurs.

The operation method may include blocking an electrical connection between a high voltage battery and the fuel cell stack by turning off a high voltage battery relay that connects the high voltage battery and the fuel cell stack and connecting the output stage of the fuel cell stack and the fuel cell load device by turning on the first relay, when a collision involving the fuel cell vehicle occurs and the high voltage battery is not in a chargeable state.

The operation method may include blocking the electrical connection between the high voltage battery and the fuel cell stack by turning off a high voltage battery relay that connects the high voltage battery and the fuel cell stack, turning off the first relay, and turning on the second relay, when the voltage at the fuel cell stack is less than a predetermined voltage.

The operation method may include blocking the electrical connection between a high voltage battery and the fuel cell stack by turning off a high voltage battery relay that connects the high voltage battery and the fuel cell stack, turning off the first relay, and turning on the second relay, when a collision involving the fuel cell vehicle occurs and the high voltage battery is not in a chargeable state.

The operation may include may include determining whether the high voltage battery is not in the chargeable state by determining at least one of: whether the high voltage battery fails, whether a converter fails, whether the SOC of the high voltage battery has exceeded a safety limit, and whether a collision has been detected by a collision sensor adjacent to the high voltage battery.

The operation method may include determining whether a high voltage battery is in the chargeable state when regenerative braking generated by braking using an engine brake is performed, and turning off the first relay and turning on the second relay when the high voltage battery is determined not to be in the chargeable state.

A maximum value of regeneration braking energy generated by the regenerative braking may be output consumed by the fuel cell load device.

The operation method may include determining whether the high voltage battery is in the chargeable state by determining at least one of: whether the high voltage battery fails, whether a converter fails, and whether the SOC of the high voltage battery has exceeded a safety limit.

The operation method may include controlling a converter connected to the high voltage battery so that a voltage at an output stage of the converter is higher than a voltage at the output stage of the fuel cell stack and high voltage components connected to a high voltage battery are driven by only the high voltage battery, when a fuel cell system fails.

The fuel cell system may include the fuel cell stack, a hydrogen supply device supplying hydrogen to the fuel cell stack, an air supply device supplying air to the fuel cell stack, and a heat and water management system controlling an operating temperature of the fuel cell stack and performing a water management function.

The operation method may include determining whether a pressure of hydrogen on an anode side of the fuel cell stack is higher than a predetermined reference pressure when the fuel cell system fails, and fixing the voltage at the output stage of the converter to a specific voltage when the pressure of hydrogen on the anode side is determined to be higher than the predetermined reference pressure. The specific voltage is a minimum voltage at which high voltage components connected to a main bus stage are operable or greater.

DETAILED DESCRIPTION OF EMBODIMENTS

Specific structural and functional descriptions of embodiments of the present disclosure disclosed herein have been illustrated in order to merely describe the embodiments of the present disclosure. The embodiments of the present disclosure may be implemented in various forms and should not be construed as being limited to the embodiments described herein.

Embodiments of the present disclosure may be modified in various ways and may have multiple forms. However, it is to be understood that embodiments according to the concept of the present disclosure are not intended to be limited to a specific disclosure, but include all changes, equivalents, and substitutions that are included in the spirit and technical scope of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Terms, such as the first and the second, may be used to describe a variety of elements, but the elements should not be limited by the terms. The terms are used to only distinguish one element from the other element. For example, a first element may be named a second element, and likewise a second element may be named a first element without departing from the scope of the present disclosure.

When it is said that one element is described as being "connected" to or "coupled" with the other element, the one element may be directly connected to or coupled with the other element, but it should be understood that a third element may be interposed between the two elements. In contrast, when it is said that one element is described as being "directly connected" to or "directly coupled" with the other element, it should be understood that a third element is not present between the two elements. Meanwhile, the same principle applies to other expressions, such as "between ~" and "just between ~" or "adjacent to ~" and "neighboring ~", which describe a relation between elements.

Terms used in this specification are used to describe only specific embodiments and are not intended to limit the present invention. An expression of the singular number should be understood to include plural expressions, unless clearly expressed otherwise in the context. It should be understood that in this application, terms, such as "include" or "have", are intended to designate the existence of described characteristics, numbers, steps, operations, elements, parts, or combination of them and understood, but are not intended to exclude the existence of one or more other characteristics, numbers, steps, operations, elements, parts, or a combination of them or the possibility addition of them.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

All terms used herein, including technical or scientific terms, have the same meanings as those typically understood by those skilled in the art unless otherwise defined. Terms, such as ones defined in common dictionaries, should be construed as having the same meanings as those in the context of related technology and should not be construed as having ideal or excessively formal meanings unless clearly defined in this specification.

Hereinafter, embodiments of the present disclosure are described in more detail with reference to the accompanying drawings. The same reference numerals are used to denote the same elements throughout the drawings. The subject of execution of steps illustrated in flowcharts, the subject of operations of a first relay and a second relay, and the subject of control of output voltage at a converter may be a fuel cell controller (FCU) or a plurality of controllers for controlling the components of a fuel cell system which communicates with the FCU.

Figure 1:
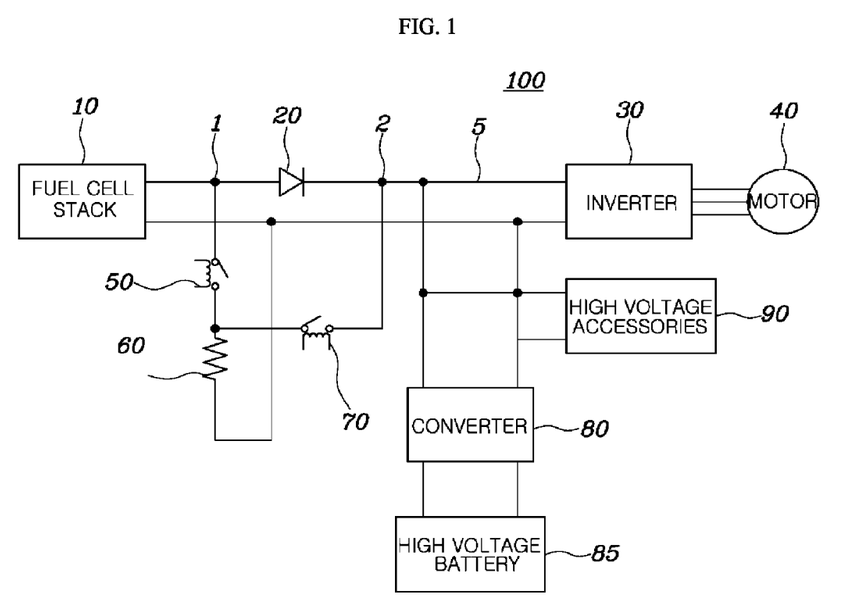
FIG. 1 is an exemplary diagram illustrating a power net system for a fuel cell vehicle in accordance with embodiments of the present disclosure.

FIG. 1 is an exemplary diagram illustrating a power net system for a fuel cell vehicle in accordance with embodiments of the present disclosure. As illustrated in FIG. 1, the power net system 100 for a fuel cell vehicle may include the following components: a fuel cell stack 10 (i.e., a main power source) and a high voltage battery (e.g., main battery) 85, that is, an auxiliary power source, connected in parallel through a main bus stage 5, a diode 20 provided on the main bus stage 5 and configured to have one end connected to the output stage of the fuel cell stack 10, a bidirectional high voltage DC/DC converter (BHDC) (hereinafter called a "converter") 80 connected to the high voltage battery 85 so that the output of the high voltage battery 85 is able to be controlled, an inverter 30 connected to the main bus stage 5 on the output side of the fuel cell stack 10 and the high voltage battery 85, a driving motor 40 connected to the inverter 30, high voltage accessories 90 within a vehicle other than the inverter 30 and the driving motor 40, a fuel cell load device 60 branched and connected between the output stage of the fuel cell stack 10 and the diode 20, a first relay 50 provided between the output stage of the fuel cell stack 10 and the fuel cell load device 60 and configured to connect or separate the output stage of the fuel cell stack 10 and the fuel cell load device 60, and a second relay 70 configured to have one end connected to the other end of the diode 20 and the other end connected between the first relay 50 and the fuel cell load device 60.

The fuel cell stack 10 that is the main power source of a vehicle, and the high voltage battery 85 that is used as an auxiliary power source are connected to loads within the power net system, such as the inverter 30 and the driving motor 40, in parallel through the main bus stage 5. The converter 80 connected to the high voltage battery 85 is connected to the main bus stage 5 on the output side of the fuel cell stack 10 so that the output of the fuel cell stack 10 and the output of the high voltage battery 85 are able to be controlled by controlling voltage at the converter 80 (i.e., output voltage to the main bus stage 5).

The diode 20 through which a reverse current does not flow is disposed in the output stage of the fuel cell stack 10. The diode 20 has one end connected to the output stage of the fuel cell stack 10 and the other end connected to one end of the second relay 70, the inverter 30, the high voltage accessories 90, and the converter 80 through a node 2. The fuel cell stack 10 and the fuel cell load device 60 may be coupled through the first relay 50 and may be connected to the inverter 30, connected to the driving motor 40, through the second relay 70.

The converter 80 is connected to the main bus stage 5. Voltage of the output stage of the converter 80 connected to the main bus stage 5 may be controlled by converting output voltage at the high voltage battery 85.

When the first relay 50 is turned on and thus the output stage of the fuel cell stack 10 and the fuel cell load device 60 are connected, voltage at the fuel cell stack 10 may be reduced or removed by the fuel cell load device 60. Furthermore, when the second relay 70 is turned on and thus the inverter 30 and the load device 60 are connected, energy attributable to the regenerative braking of the driving motor 40 connected to the inverter 30 may be consumed by the fuel cell load device 60. In this case, the first relay 50 and the second relay 70 are not turned on at the same time. A high voltage part refers to a part driven by high voltage, such as the high voltage accessories 90 or the driving motor 40.

Figure 2:
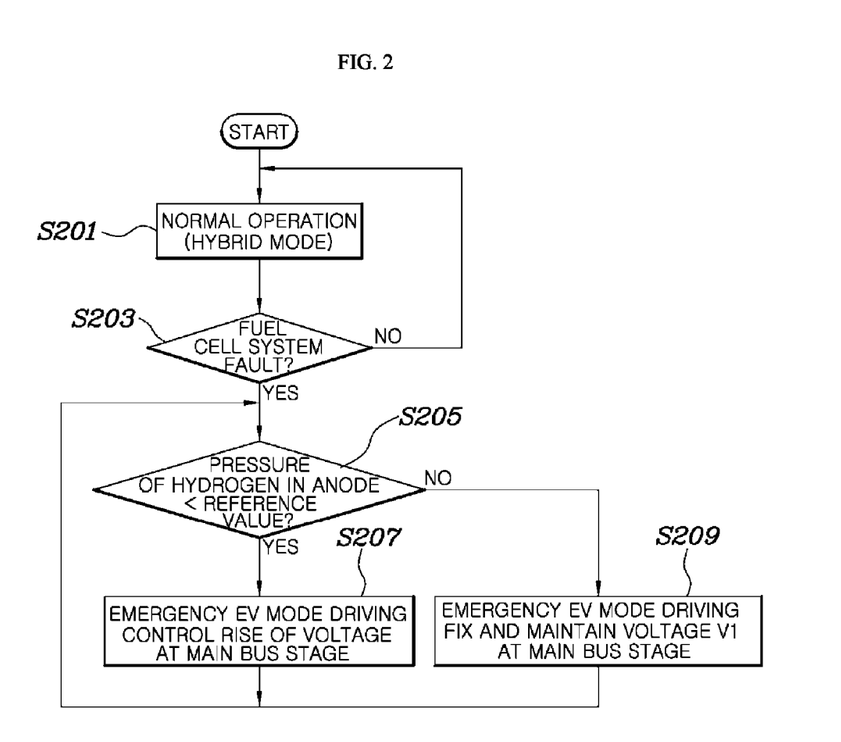
FIGS. 2 to 5 are exemplary flowcharts illustrating methods of controlling the power net system for a fuel cell vehicle in accordance with embodiments of the present disclosure.

FIGS. 2 to 5 are exemplary flowcharts illustrating methods of controlling the power net system for a fuel cell vehicle in accordance with embodiments of the present disclosure. In particular, FIGS. 2 to 5 illustrate the methods of controlling the power net system for a fuel cell vehicle illustrated in FIG. 1. As shown in FIG. 2, during a normal operation at step S201, the fuel cell vehicle determines whether a failure has occurred in the fuel cell system at step S203. If a failure is determined to have occurred in the fuel cell system, whether pressure of hydrogen within the anode of the fuel cell stack 10 is lower than predetermined reference pressure is determined at step S205. In this case, the occurrence of a failure in the fuel cell system refers to the state in which at least some components of the fuel cell system, including the fuel cell stack, the hydrogen supply device for supplying hydrogen, that is, fuel, to the fuel cell stack, the air supply device for supplying air including oxygen, that is, an oxidizer for an electrochemical reaction, to the fuel cell stack, and the heat and water management system for optimally controlling the operating temperature of the fuel cell stack by externally discharging heat, that is, an electrochemical reaction product of the fuel cell stack, and performing a water management function, do not normally operate.

A power generation stop process performed by the fuel cell stack 10 may include first stopping the supply of oxygen to the fuel cell stack 10, removing voltage at the fuel cell stack 10, and stopping the supply of hydrogen to the fuel cell stack 10. In this case, the removal of the voltage at the fuel cell stack 10 may be performed using the fuel cell load device 60. If hydrogen within the fuel cell stack 10 is insufficient, the voltage at the fuel cell stack 10 may be dropped through crossover. If the output of the fuel cell stack 10 is generated in the state when hydrogen is insufficient, the fuel cell stack 10 may be deteriorated. In order to prevent an electric current from being output by the output stage of the fuel cell stack 10, voltage at the main bus stage 5 is raised through the converter 80 at step S207. That is, if the pressure of hydrogen on the anode side of the fuel cell stack 10 is determined to be lower than the predetermined reference pressure, voltage is controlled so that voltage at the output stage of the converter 80 is higher than voltage at the output stage of the fuel cell stack 10 in order to prevent an electric current from being output by the fuel cell stack 10. The predetermined reference pressure may be minimum hydrogen supply pressure for preventing the shortage of hydrogen on the anode side.

If the pressure of hydrogen on the anode side is equal to or higher than the predetermined reference pressure, the high voltage battery 85 is charged with output generated by a reaction of oxygen and hydrogen within the fuel cell stack

10. That is, if the pressure of hydrogen on the anode side is equal to or higher than the predetermined reference pressure, voltage at the output stage of the converter 80 may be fixed to a specific voltage V1. If the voltage at the output stage of the converter 80 is fixed to the specific voltage V1, the high voltage battery 85 may be charged with the output of the fuel cell stack 10 until voltage at the output stage of the fuel cell stack 10 decreases to the specific voltage V1. The specific voltage V1 may be previously set based on factors, such as driving efficiency of the converter 80 and driving efficiency of the high voltage accessories 90.

Figure 3:
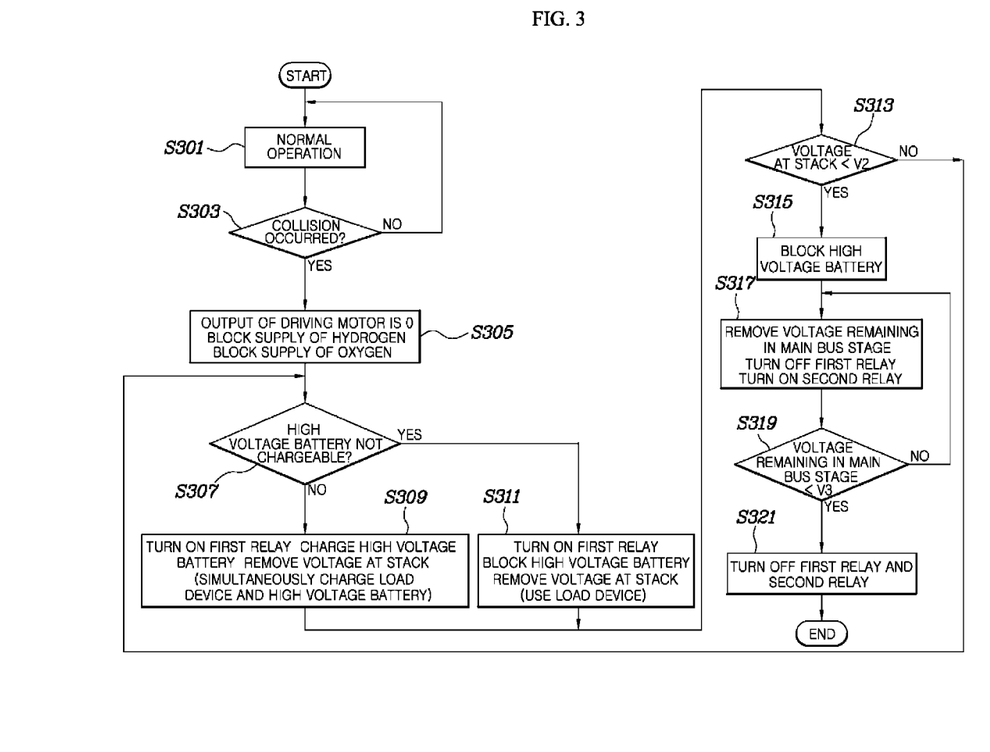

As shown in FIG. 3, if a collision is generated in the fuel cell vehicle at step S303 while the fuel cell vehicle normally operates at step S301, first, the output of the driving motor 40 is controlled so that it becomes 0, and the supply of hydrogen and oxygen to the fuel cell stack 10 may be blocked at step S305. Thereafter, whether the high voltage battery 85 is in a chargeable state is determined at step S307. Whether the high voltage battery 85 is in the chargeable state may be determined based on at least one of whether the high voltage battery 85 fails, whether the converter 80 fails, whether the state of charge (SOC) of the high voltage battery 85 has exceeded a safety limit (i.e., whether the SOC of the high voltage battery 85 is excessive), and whether a collision has been detected by a collision sensor adjacent to the high voltage battery 85.

If the high voltage battery 85 is determined to be in the chargeable state, the high voltage battery 85 is charged and at the same time, the first relay 50 is turned on, so the voltage at the fuel cell stack 10 is removed through the fuel cell load device 60 in order to lower the voltage at the fuel cell stack 10 at step S309. That is, if the high voltage battery 85 is in the chargeable state, the converter 80 connected to the high voltage battery 85 may be controlled so that voltage at the output stage of the converter 80 is lower than that at the output stage of the fuel cell stack 10. That is, when a collision is generated in the fuel cell vehicle, the first relay 50 may be turned on and at the same time, voltage at the output stage of the converter 80 connected to the high voltage battery 85 may be controlled so that the voltage at the output stage of the converter 80 is lower than that at the output stage of the fuel cell stack 10. Accordingly, there is an advantage in that speed that voltage at the fuel cell stack 10 is removed can be improved.

If the high voltage battery 85 is not in the chargeable state, voltage at the main bus stage 5 is controlled and the first relay 50 is turned on so that the voltage at the fuel cell stack 10 is removed by only the fuel cell load device 60 at step S311. That is, if the high voltage battery 85 is not in the chargeable state, the converter 80 may be controlled so that voltage at the output stage of the converter 80 connected to the high voltage battery 85 is higher than that at the output stage of the fuel cell stack 10. A high voltage battery relay (not shown) for connecting the high voltage battery 85 and the fuel cell stack 10 may be turned off in order to block an electrical connection between the high voltage battery 85 and the fuel cell stack 10, and the first relay 50 may be turned on in order to connect the output stage of the fuel cell stack 10 and the fuel cell load device 60. Alternatively, the high voltage battery relay for connecting the high voltage battery 85 and the fuel cell stack 10 may be turned off in order to block an electrical connection between the high voltage battery 85 and the fuel cell stack 10, and the first relay 50 may be turned off in order to turn on the second relay 70.

Whether the voltage at the fuel cell stack 10 is lower than a specific voltage V2 while removing the voltage at the fuel cell stack 10 is determined at step S313. If the voltage at the fuel cell stack 10 is lower than the specific voltage V2, a connection between the high voltage battery 85 and the main bus stage 5 is blocked using the high voltage battery relay (not shown). That is, input to and output from the high voltage battery 85 are blocked by turning off the high voltage battery relay so that voltage is no longer applied by the high voltage battery 85 at step S315. The first relay 50 may be turned off and the second relay 70 may be then turned on so that voltage remaining in the main bus stage 5 is removed by the fuel cell load device 60 at step S317.

After the second relay 70 is turned on, whether voltage at the main bus stage 5 is less than a specific voltage V3 is determined. If the voltage remaining in the main bus stage 5 is determined to be less than the specific voltage V3, both the first relay 50 and the second relay 70 may be turned off.

In this case, V2 and V3 may have the same value and may have the highest value at which security is secured. That is, of voltage at the fuel cell stack 10 is less than V2 and voltage at the main bus stage 5 is less than V3, it may be determined that security is guaranteed because the amount of voltage at the fuel cell stack 10 and the main bus stage 5 is very small. Ideally, V2 and V3 may be 0.

Figure 4:
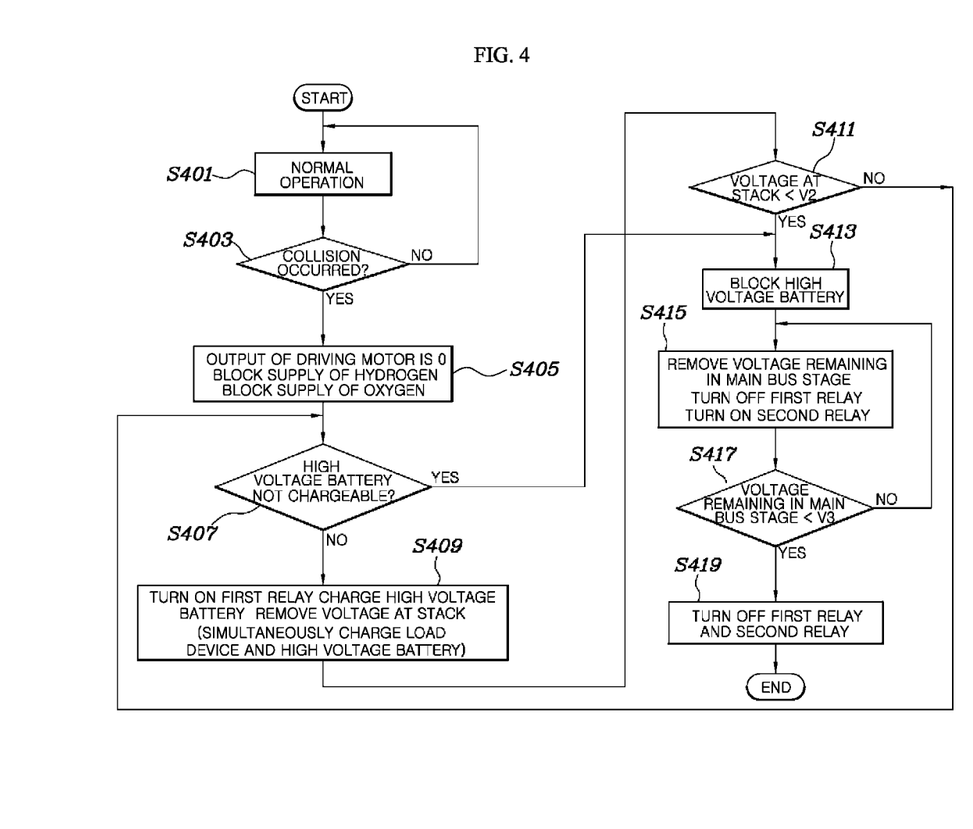

As shown in FIG. 4, step S401 to step S407 are the same as step S301 to step S307. If the high voltage battery 85 is determined to be in the chargeable state at step S407, the output of the fuel cell stack 10 is used to charge the high voltage battery 85 and at the same time, the first relay 50 is turned on so that voltage at the fuel cell stack 10 is removed through the fuel cell load device 60 in order to lower the voltage at the fuel cell stack 10 at step S409. That is, if the high voltage battery 85 is in the chargeable state, the converter 80 may be controlled so that voltage at the output stage of the converter 80 connected to the high voltage battery 85 is lower than voltage at the output stage of the fuel cell stack 10 and at the same time, the first relay 50 may be turned on so that the output stage of the fuel cell stack 10 and the fuel cell load device 60 are connected. Whether the voltage at the fuel cell stack 10 is lower than a specific voltage V2 through control of the voltage drop of the fuel cell stack 10 is determined at step S411. If the voltage at the fuel cell stack 10 is determined to be lower than the specific voltage V2, a connection between the high voltage battery 85 and the main bus stage 5 is blocked. That is, input to and output from the high voltage battery 85 are blocked so that voltage is no longer applied by the high voltage battery 85 at step S413. Subsequent steps are the same as those of FIG. 3, and a description thereof is omitted.

Figure 5:
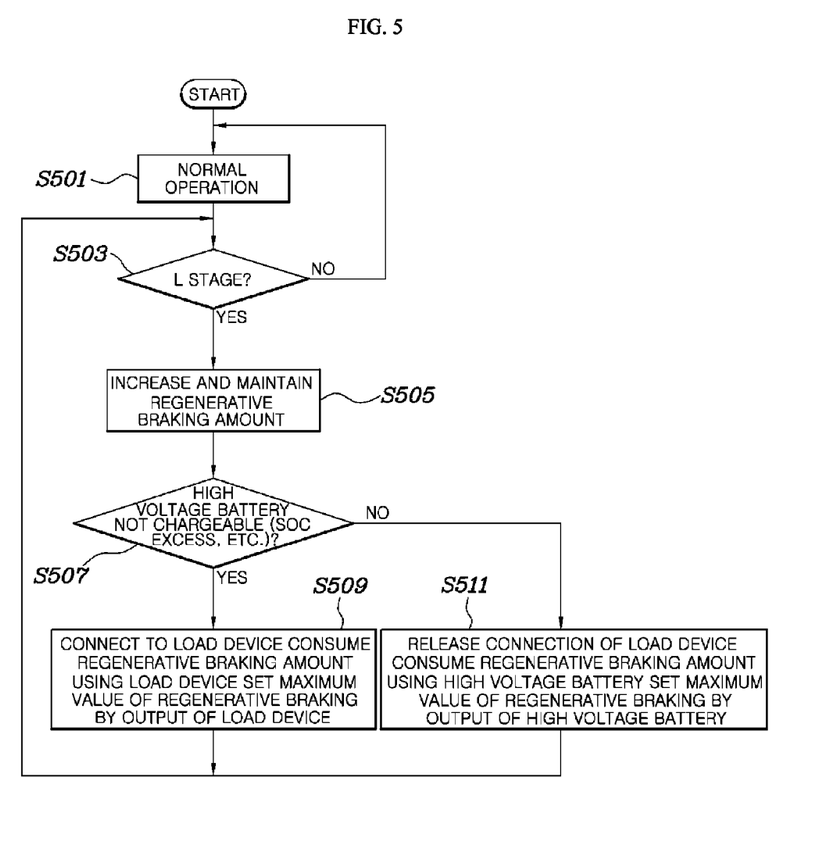

FIG. 5 illustrates a method of controlling the power net system 100 when a braking force is generated by the regenerative braking of the driving motor 40 while the fuel cell vehicle normally operates at step S501. In the case of an L stage (i.e., an engine braking function. In this case, a braking force is generated by the regenerative braking of the driving motor 40 of the fuel cell vehicle) at step S503, regeneration braking energy from the driving motor 40 is increased and maintained at step S505. Thereafter, whether the high voltage battery 85 is in the chargeable state is determined at step S507. That is, the L stage refers to operation mode in which the output of the regenerative braking of the driving motor is increased instead of a hydraulic brake in order to maintain a feeling of braking even without a manipulation of a brake pedal by a driver. If the high voltage battery 85 is determined to be not in the chargeable state, the first relay 50 is turned off and the second relay 70 is turned on so that the inverter 30 is connected to the fuel cell load device 60. Accordingly, regeneration braking energy is consumed by the fuel cell load device 60. A maximum value of the regeneration braking energy supplied to the load device 60 depends on the output of the load device 60.

Accordingly, although the high voltage battery 85 is unable to be charged, regeneration braking energy from the driving motor 40 is consumed by the fuel cell load device 60. Accordingly, there is an advantage in that a feeling of braking can be maintained because the amount of regenerative braking can be secured.

If the high voltage battery 85 is able to be charged, both the first relay 50 and the second relay 70 are turned off so that regeneration braking energy from the driving motor 40 is used to charge the high voltage battery 85. A maximum value of the regeneration braking energy may be determined by a limit capacity of the high voltage battery 85.

In accordance with the power net system for a fuel cell vehicle and the methods of controlling the same according to embodiments of the present disclosure, there is an advantage in that the output of the fuel cell stack can be blocked by controlling voltage at the main bus stage when a failure is generated in the fuel cell system. Further, when a failure is generated in the fuel cell system, output generated by hydrogen that remains on the anode side depending on pressure of hydrogen on the anode side is charged in the high voltage battery. Even further, there is an advantage in that the fuel cell stack can be prevented from being exposed to a danger of high voltage by lowering voltage at the fuel cell stack and voltage remaining in the main bus stage when a collision is generated in the fuel cell vehicle. Yet even further, there are advantages in that the high voltage battery can be charged with regeneration braking energy when regenerative braking is generated and a feeling of braking can be secured because the regeneration braking energy is consumed by the fuel cell load device.

While the disclosed embodiments have been described with respect to the specific embodiments, it will be apparent to those skilled in the art that various changes and modifications may be made without departing from the spirit and scope of the present disclosure as defined in the following claims.

What is claimed is:

1. A power net system for a fuel cell vehicle, comprising: a diode having a first end connected to an output stage of a fuel cell stack; a fuel cell load device branched and connected between the output stage of the fuel cell stack and the diode; a first relay positioned between the output stage of the fuel cell stack and the fuel cell load device and configured to connect or separate the output stage of the fuel cell stack and the fuel cell load device; and a second relay having a first end connected to a second end of the diode and a second end connected between the first relay and the fuel cell load device, wherein the first relay and the second relay are not simultaneously turned on.

2. The power net system of claim 1, further comprising an inverter connected to a node configured to connect the second end of the diode and the first end of the second relay.

3. The power net system of claim 2, further comprising a converter connected to a main bus stage between the fuel cell stack and the inverter and configured to control a voltage at the main bus stage.

4. The power net system of claim 2, wherein energy attributable to regenerative braking of a motor connected to the inverter is consumed by the fuel cell load device, when the second relay is turned on and the inverter and the fuel cell load device are connected.

5. The power net system of claim 1, wherein voltage at the fuel cell stack is reduced by the fuel cell load device, when the first relay is turned on and the output stage of the fuel cell stack and the fuel cell load device are connected.

6. An operation method of the power net system for a fuel cell vehicle of claim 1, the method comprising: connecting the output stage of the fuel cell stack and the fuel cell load device by turning on the first relay and simultaneously controlling voltage at an output stage of a converter connected to a high voltage battery so that the voltage at the output stage of the converter is lower than a voltage at the output stage of the fuel cell stack, when a collision involving the fuel cell vehicle occurs.

7. The operation method of claim 6, further comprising blocking the electrical connection between the high voltage battery and the fuel cell stack by turning off a high voltage battery relay that connects the high voltage battery and the fuel cell stack, turning off the first relay, and turning on the second relay, when the voltage at the fuel cell stack is less than a predetermined voltage.

8. An operation method of the power net system for a fuel cell vehicle of claim 1, the method comprising: blocking an electrical connection between a high voltage battery and the fuel cell stack by turning off a high voltage battery relay that connects the high voltage battery and the fuel cell stack and connecting the output stage of the fuel cell stack and the fuel cell load device by turning on the first relay, when a collision involving the fuel cell vehicle occurs and the high voltage battery is not in a chargeable state.

9. The operation method of claim 8, further comprising determining whether the high voltage battery is not in the chargeable state by determining at least one of: whether the high voltage battery fails, whether a converter fails, whether a state of charge (SOC) of the high voltage battery has exceeded a safety limit, and whether a collision has been detected by a collision sensor adjacent to the high voltage battery.

10. An operation method of the power net system for a fuel cell vehicle of claim 1, the method comprising: blocking the electrical connection between a high voltage battery and the fuel cell stack by turning off a high voltage battery relay that connects the high voltage battery and the fuel cell stack, turning off the first relay, and turning on the second relay, when a collision involving the fuel cell vehicle occurs and the high voltage battery is not in a chargeable state.

11. An operation method of the power net system for a fuel cell vehicle of claim 1, the method comprising: determining whether a high voltage battery is in a chargeable state when regenerative braking is performed; and turning off the first relay and turning on the second relay when the high voltage battery is determined not to be in the chargeable state.

12. The operation method of claim 11, wherein a maximum value of regeneration braking energy generated by the regenerative braking is output consumed by the fuel cell load device.

13. The operation method of claim 11, further comprising determining whether the high voltage battery is in the chargeable state by determining at least one of: whether the high voltage battery fails, whether a converter fails, and whether a state of charge (SOC) of the high voltage battery has exceeded a safety limit.

14. An operation method of the power net system for a fuel cell vehicle of claim 1, the method comprising:

controlling a converter connected to a high voltage battery so that a voltage at an output stage of the converter is higher than a voltage at the output stage of the fuel cell stack and high voltage components connected to a high voltage battery are driven by only the high voltage battery, when a fuel cell system fails.

15. The operation method of claim 14, wherein the fuel cell system includes the fuel cell stack, a hydrogen supply device supplying hydrogen to the fuel cell stack, an air supply device supplying air to the fuel cell stack, and a heat and water management system controlling an operating temperature of the fuel cell stack and performing a water management function.

16. The operation method of claim 15, further comprising:
determining whether a pressure of hydrogen on an anode side of the fuel cell stack is higher than a predetermined reference pressure when the fuel cell system fails; and
fixing the voltage at the output stage of the converter to a specific voltage when the pressure of hydrogen on the anode side is determined to be higher than the predetermined reference pressure,
wherein the specific voltage is a minimum voltage at which high voltage components connected to a main bus stage are operable or greater.

* * * * *